United States Patent Office 3,321,835
Patented May 30, 1967

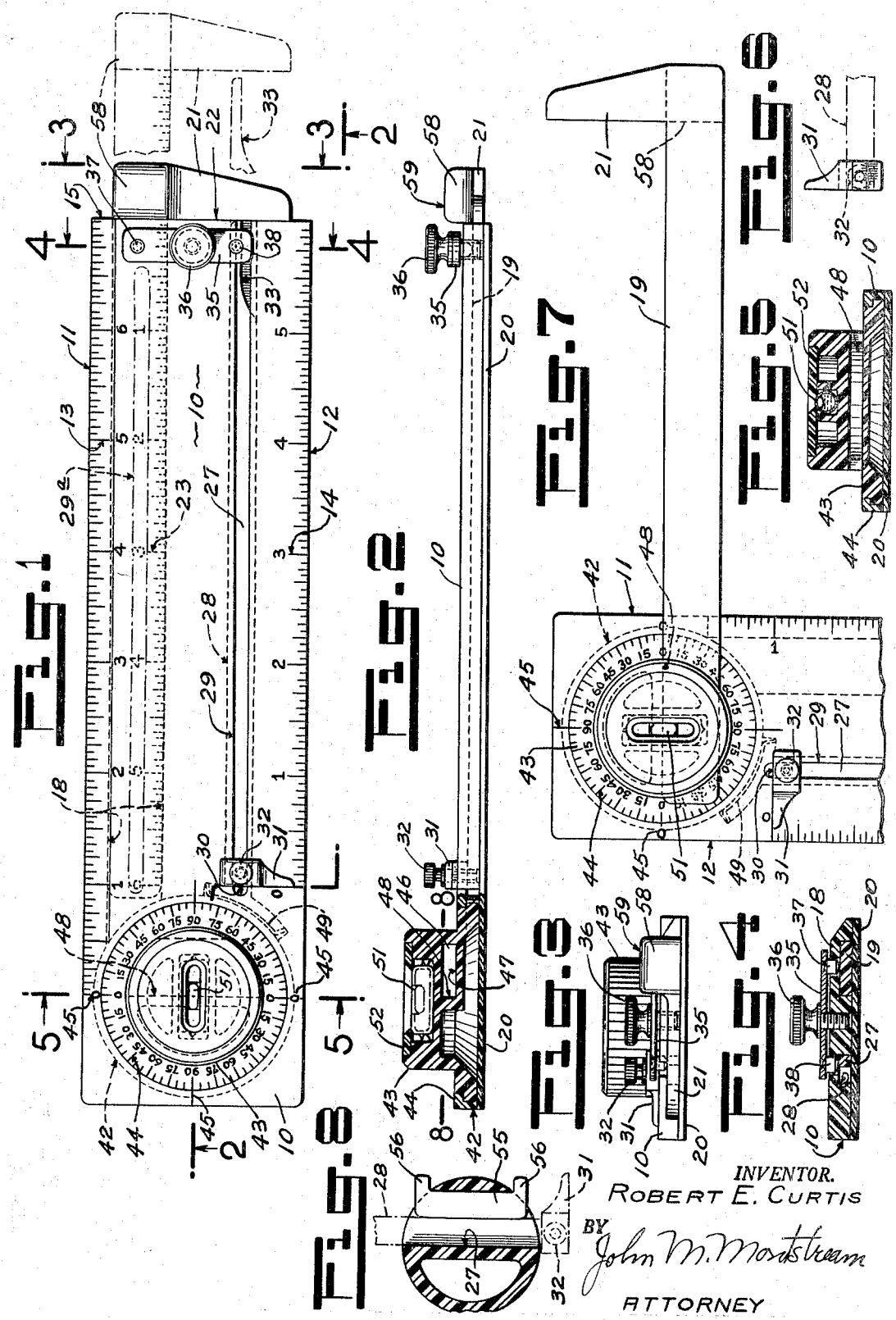

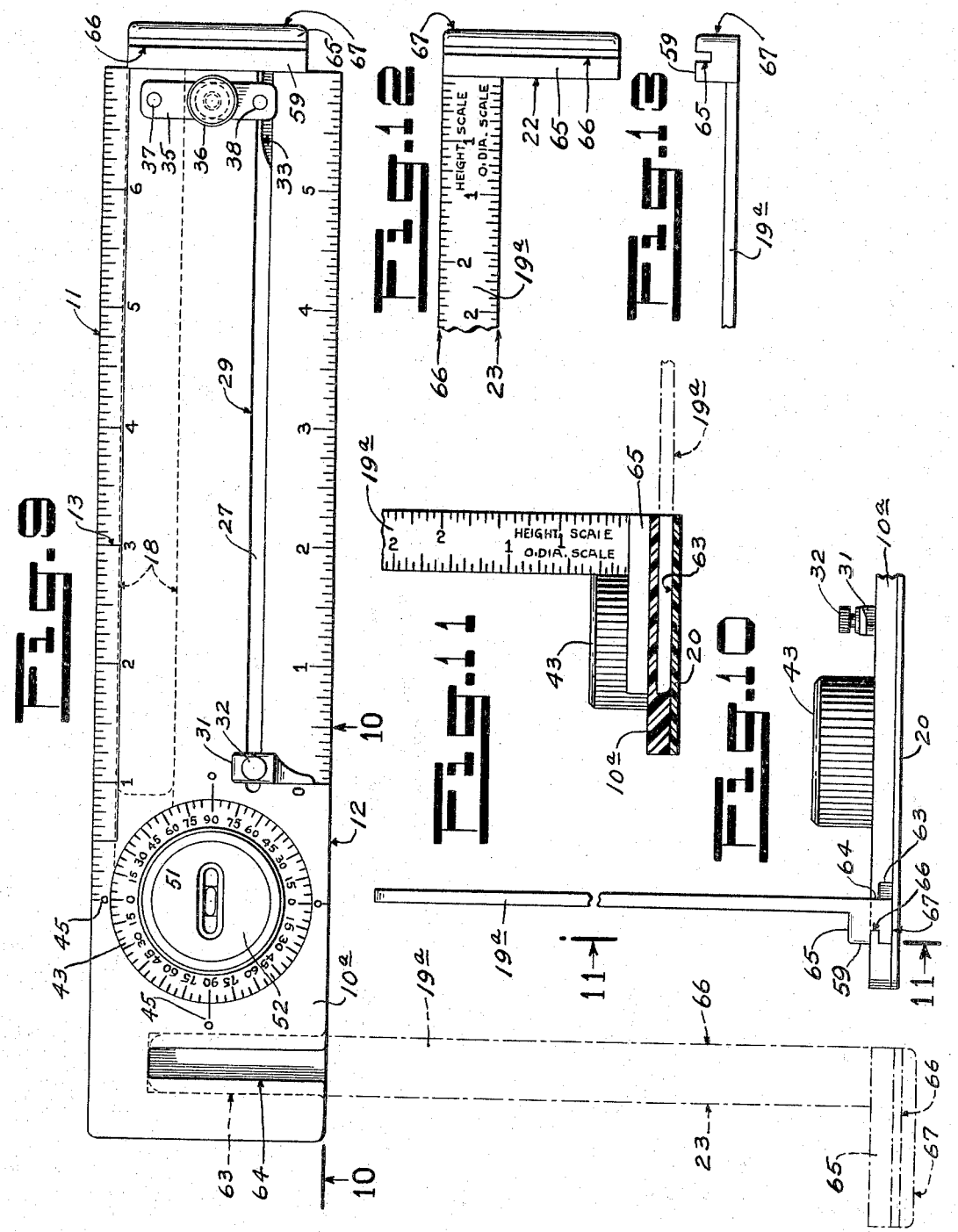

3,321,835
TOOL FOR DIMENSIONAL AND/OR ANGULAR
MEASURING
Robert E. Curtis, 5307 8th Ave.,
Brooklyn, N.Y. 11220
Filed July 8, 1965, Ser. No. 470,455
9 Claims. (Cl. 33—75)

The invention relates basically to a tool for dimensional and angularity measuring and/or drawing in which a dimensional member serves a double function but preferably also incorporates at least one or more of additional means for conveniently measuring diameters, the depth of a hole, a height, for leveling, and to construct a square.

The principal object of the invention is to provide a tool, having a plurality of slides which receives a dimensional member so that the tool is convertible into one capable of making a plurality of measurements with at least two members.

It is also an object to provide a dimensional measuring tool having a main member of substantial width with one end squared with respect to the longitudinal edges and at the other end having a protractor disk with a slide such that another measuring member which is received by the main member and removable from the squared end and insertable in the protractor slide for measuring or drawing angles.

Another object is as above and, in addition, there is provided a level readable from one of the longitudinal edges from the main member so that the tool may serve as a level and secondly so that the tool may serve in determining the incline or perpendicularity of some structure such as roof rafters and uprights.

A further object is as any of the above in which the other member is used for measuring diameters.

Again it is an object as in any one of the above in which the same or another member is usable to measure heights.

A further object is as any one of the above in which the other member is a depth gage.

Another object is to construct a tool comprising a scale as a main member and provided with another member slidably received in at least two slides carried by the scale so that the other member serves two or three additional functions.

The optimum object is to embody all of the above features in the tool.

Other objects of the invention will be more apparent from the following description when taken in connection with the accompanying drawings illustrating preferred embodiments thereof in which:

FIG. 1 is a top view of the tool;
FIG. 2 is a side view with a protractor disk in section taken on line 2—2 of FIG. 1;
FIG. 3 is an end view;
FIG. 4 is a section taken on line 4—4 of FIG. 1;
FIG. 5 is a cross section taken on line 5—5 of FIG. 1;
FIG. 6 is a bottom view of a pointer for the depth gage;
FIG. 7 is a partial view of the tool at the protractor end with the diameter measuring tool in a protractor slide;
FIG. 8 is a sectional view of the protractor disk with a filler in the protractor slide to accommodate the depth gage in the protractor slide;
FIG. 9 is a top view of the tool in which the diameter measuring member carries a head for diameter measuring and in addition carries a guideway for insertion in a slide therefor, for use as a square;
FIG. 10 illustrates the tool and dimensional member used as a height gage;
FIG. 11 is a section taken on line 11—11 of FIG. 10;
FIG. 12 illustrates the scales carried by the diameter measuring member; and
FIG. 13 is an end view of the member.

The tool includes a main member 10 having longitudinal edges 11 and 12 along at least one of such edges a scale 13 and 14 with the scale 13 beginning at the zero marking for a protractor disk as will be described. One end 15 of the main member is square with respect to the longitudinal edges.

The tool provides at least one other member which is receivable in a slide 18 extending lengthwise in the main member from the squared end 15. A dimensional member 19 is received therein, which member may be used to measure dimensions such as a diameter. A convenient way to make the slide 18 is to provide a slot in the main member and cover the same with a cover plate 20 suitably secured to the main member such as by cementing if the parts are of plastic. The dimensional member carries a head 21 extending laterally therefrom and having an edge 22 at right angles to the member. Preferably, the dimensional member carries its own scale 23. By withdrawing the head 21 outwardly and placing a piece to be measured between the edge 22 and the end 15 of the main member, a dimension of a part may be measured.

The other member may be a depth gage 27 which is receivable in a slide 28 carried by the main member and extending from the squared end. The depth gage member is narrow so as to be insertable in a hole, groove or the like. The extent of projection of the depth gage below the squared end 15 may be determined by a suitable scale which could be carried by the depth gage member as taught by the scale 23 carried by the dimensional member. The scale means for determining the depth of a hole in the construction illustrated provides a slot 29 through the main member to the slide 28 and having the length of the depth gage member the same as that of the scale 14. The depth of the hole is determined on the scale which may extend between the longitudinal edge 12 and the edge of the slot 29. It is more convenient, however, to attach a finger or pointer 31 to the end of the depth gage, such as by a screw 32, which finger projects over the scale 14. The end of the depth gage member may have its projectable end 33 narrowed for small holes which usually are not deep.

Suitable means may be provided to place a drag on the slide members so that they remain in measuring position, that shown includes a resilient bar 35 attached to the main member by a screw 36. This bar has a projection 37 extending through a hole in the main member into the slide 18 so that its end engages the diameter member 19. The bar also carries a projection 38 which passes through a hole in the main member into the slide 28 so that its end engages the depth gage 27. The resilient bar normally stands away from the top surface of the main member so that the drag pressure of the diameter member and depth gage member may be adjusted as desired.

At the end of the main member oppositely from the squared end 15, there is provided a protractor mounting means in the form of circular recess 42. A protractor disk 43 is retained in the mounting means by a shoulder 44 and by the cover plate 20. An angular scale 44 is carried by one of the members including the disk or the main member, the scale being shown on the disk, and the other part carrying one or more marks 45. The protractor projects above the top surface of the main member and carries a slide 46 to receive one of the other measuring members such as the dimensional member 19. This slide is above the top surface of the main member with the surface 47 in or close to the plane of the top surface, that is, it is closely in the region of the top surface of the main member. The protractor slide 46 is shown having a width to receive the dimensional member 19. One edge 48 of the protractor slide 46 is on a diameter of the protractor disk. Suitable drag means is provided for the protractor disk to hold in adjusted position that illustrated being a drag spring 49, received in a cavity extending from the mounting means in the main member and pressing against the protractor disk.

Preferably, the protractor disk carries a level cell or bubble 51 suitably secured in a cavity therein by a plate 52 suitably secured or cemented in place. This bubble is positioned so that in the position of the protractor disk illustrated, the bubble is in center position with respect to a longitudinal edge of the main member. The level cell is shown as at right angles to the protractor slide, however, it could just as well be parallel therewith.

In order to measure or draw angles, the dimensional member 19 is withdrawn from its slide and inserted in the protractor slide 46. By turning the protractor disk, the angle between two members may be measured between a longitudinal edge of the main member and either edge of the dimensional member 19. The angle of the slope of a surface such as a roof or roof rafter may be determined by placing one edge of the main member on the sloping surface and then turning the protractor until the level cell or bubble 51 centers. Similarly, whether or not a part or surface is vertical may be determined by placing one of the longitudinal edges of the main member against the surface and turning the protractor disk until the bubble centers and if the zero of the angular scale falls on the cooperating zero on the main member, it is known that the surface is vertical. Other uses of the tool and its level may be devised.

There is shown in FIG. 8, a filler 55 which is receivable in the protractor slide 46 and when inserted and moved laterally, the projections 56 engage the ends of the slide and retain the same in position in the slide. This narrows the protractor slide so that it has a width to receive the depth gage 27. This figure teaches that in a construction of tool which includes solely the depth gage, this gage may be removed from its slide 28 by removing the finger 31, if one is provided, and inserting the depth gage in a slide having a width solely to receive the depth gage. In the construction particularly illustrated where both a dimensional member and a depth gage member is provided, it is more practical for the protractor slide to be used solely with the dimensional member 19. In order to provide greater stability for the tool when the dimensional member 19 is inserted within the protractor slide, the head 21 may be provided with a rest 58 such that its surface 59 will be in the plane of the bottom of the main member or particularly the bottom of its cover 20. In other words, the rest 58 has a vertical dimension equal to that between the surface 47 of the protractor slide and the bottom surface of the cover.

The tool may be provided with other adaptations as illustrated in FIG. 9 in which similar parts are similarly numbered but with a letter added. In the gage illustrated in this figure, the main member 10a is somewhat longer to provide space for a third slide 63, shown as a lateral slot extending from one of the longitudinal edges of the main member such as the edge 12 so that it will receive the dimensional member to form a square. Preferably, this slide 63 has a slot 64 extending through the top surface of the main member so that with a lateral slide the slot is lateral. The head 65 of the dimensional member has parallel edges and with the head thickness being greater than the depth of the slide, carries a groove 66. The dimensional member 19a may be received in the slot 63 as illustrated in dot-dash lines in FIG. 9 so that the tool now forms a square. Or, the dimensional member 19a may have its head 65 inserted into slot 63 in the manner illustrated in FIG. 10 in which case the dimensional member 19a will serve as a height gage. The dimensional member 19a, FIG. 12, is shown with a height scale 66 at one edge thereof beginning from, or having its zero at, the bottom of the cover 20, FIG. 10 and a dimensional scale 23 beginning from the inner edge 22 of the head. The surface 59 is located to be in the plane of the bottom of the main member as described. It is clear that the head may have a width from surface 22 to be received directly into the lateral slide 63. The former gives better support. With a slide having a length corresponding to the length of the head 65, the edge of the dimensional member 19a having the scale 66 is in line with the longitudinal edge 12 of the main member.

It is clear that the slide 18 for the dimensional member may have a slot 29a, indicated in dot-dash lines, extending to the top surface as taught by the slot 29 as well as the same type of finger for use with the scale 13. In such construction, the scale 23 may be dispensed with. It is apparent too that the tool with the main member solely as a scale with at least slides which receive the dimensional member provides a scale or tool in which the single dimensional member serves at least two functions and preferably three, namely as a tool for measuring diameters, squares and the like between the squared end 15 of main member and the surface 22 of the head of the dimensional member, as a square when the dimensional member is inserted in the lateral slide 63 and/or as a height gage when inserted vertically in the slide 63. In addition, of course, the slide provided in the protractor disk 43 is one of the plurality of slides carried by the main member.

This invention is presented to fill a need for improvements in scale, protractor and depth gage combination. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A tool for a plurality of measurements comprising a main member having a first longitudinal edge and another longitudinal edge and an end squared with respect to a first longitudinal edge, a top and a bottom surface, the main member having substantial width between longitudinal edges, a plurality of slides carried by the main member including a longitudinal slide extending from the squared end and parallel to the first longitudinal edge, a dimensional member having a width receivable in the longitudinal slide, the dimensional member being removable from the longitudinal slide, a head on the dimensional member having an inner surface at right angles to the longitudinal edges of the dimensional member, a second slide carried by the main member and extending from an edge thereof and having a width and depth corresponding with the width and thickness of the dimensonal member to receive the same extending laterally, a slot from the top surface of the main member into the second slot and in alignment therewith, the head of the dimensional member having a dimension to be received into the second slide with the dimensional member extending vertically with respect to the top surface, and at least one scale carried by the dimensional member.

2. A tool for a plurality of measurements comprising a main member having a first longitudinal edge, another longitudinal edge, an end squared with respect to the first longitudinal edge, a top and a bottom surface, the main member having substantial width between longitudinal edges, and a longitudinal slide extending from the squared end and parallel to the first longitudinal edge; a dimensional member having a width receivable in the longitudinal slide and having longitudinal edges, the dimensional member being removable from the longitudinal slide, a head on the dimensional member, having an inner surface at right angles to the longitudinal edges of the dimensional member, at least one scale carried by the dimensional member, a scale along a longitudinal edge of the main member having a zero, a circular protractor disk, mounting means carried by the main member at the other end thereof and turnably mounting the protractor disk, one of the parts including the main member and the disk having angular scale marks and cooperating marks on the other part, a zero mark on the main member being at right angles to the longitudinal edge through the center of the protractor disk and corresponding with the zero on the scale on a longitduinal edge of the main member, the disk projecting above the top surface of the main member, a protractor slide carried by the protractor disk above the top surface of the main member, the protractor slide having a cross section to slidably receive the dimensional member and one surface being in the region of the plane of the top surface of the main member, and the protractor slide having an edge on a diameter of the protractor disk.

3. A tool as in claim 1 including a second longitudinal slide of narrow dimension and extending from the squared end, and a depth gage slidably received in the second longitudinal slide.

4. A tool as in claim 1 in which the scale on the dimensional member has a zero at the inner edge of the head and including a second scale having its zero point at the bottom of the main member when the dimensional member is in the lateral slot at right angles to the face of the main member.

5. A tool as in claim 2 including a narrow depth gage member substantially narrower than the dimensional member so as to be received in a hole and the like, a second longitudinal slide receiving the depth gage member, a slot through the main member to the second slide, a removable filler fitting into the protractor slide to narrow the same to a dimension to slidably receive the depth gage member.

6. A tool as in claim 2 in which the dimensional member head extends laterally from a surface of the dimensional member equal to the thickness of the main member to provide an end support for the dimensional member when carried by the protractor slide.

7. A tool as in claim 2 including a slide extending laterally inwardly from a longitudinal edge of the main member at right angles to said edge and having a width and a depth corresponding to the width and thickness of the dimensional member to receive the same and which lateral slide includes a slot extending to the top surface of the main member and the head of the dimensional member having a dimension to be received in the lateral slide with the dimensional member extending vertically through the slot, and a scale extending longitudinally of the dimensional member having its zero at the bottom surface of the main member.

8. A tool as in claim 7 including a head having a thickness greater than the lateral slide, and a groove in the head to receive the edge of the slot.

9. A tool as in claim 7 including a scale carried by the dimensional member having a zero point at the bottom of the main member when the head of the dimensional member is received in the lateral slot with the dimensional member projecting vertically through the slot, and a scale carried by the dimensional member having its zero at the bottom inner edge of the head.

References Cited

UNITED STATES PATENTS

| | | | |
|---|---|---|---|
| 31,987 | 4/1861 | Light | 33—94 X |
| 401,292 | 4/1889 | Mumford | 33—161 |
| 484,567 | 10/1892 | Broadbooks | 33—143 X |
| 659,147 | 10/1900 | Holsclaw | 33—88 |
| 728,790 | 5/1903 | West | 33—143 |
| 1,638,887 | 8/1927 | Sirokman | 33—169 |
| 3,061,932 | 11/1962 | Allen | 33—94 |

FOREIGN PATENTS 172,818 12/1921 Great Britain.

LEONARD FORMAN, *Primary Examiner.*

H. N. HAROIAN, *Assistant Examiner.*